United States Patent Office 2,876,488
Patented Mar. 10, 1959

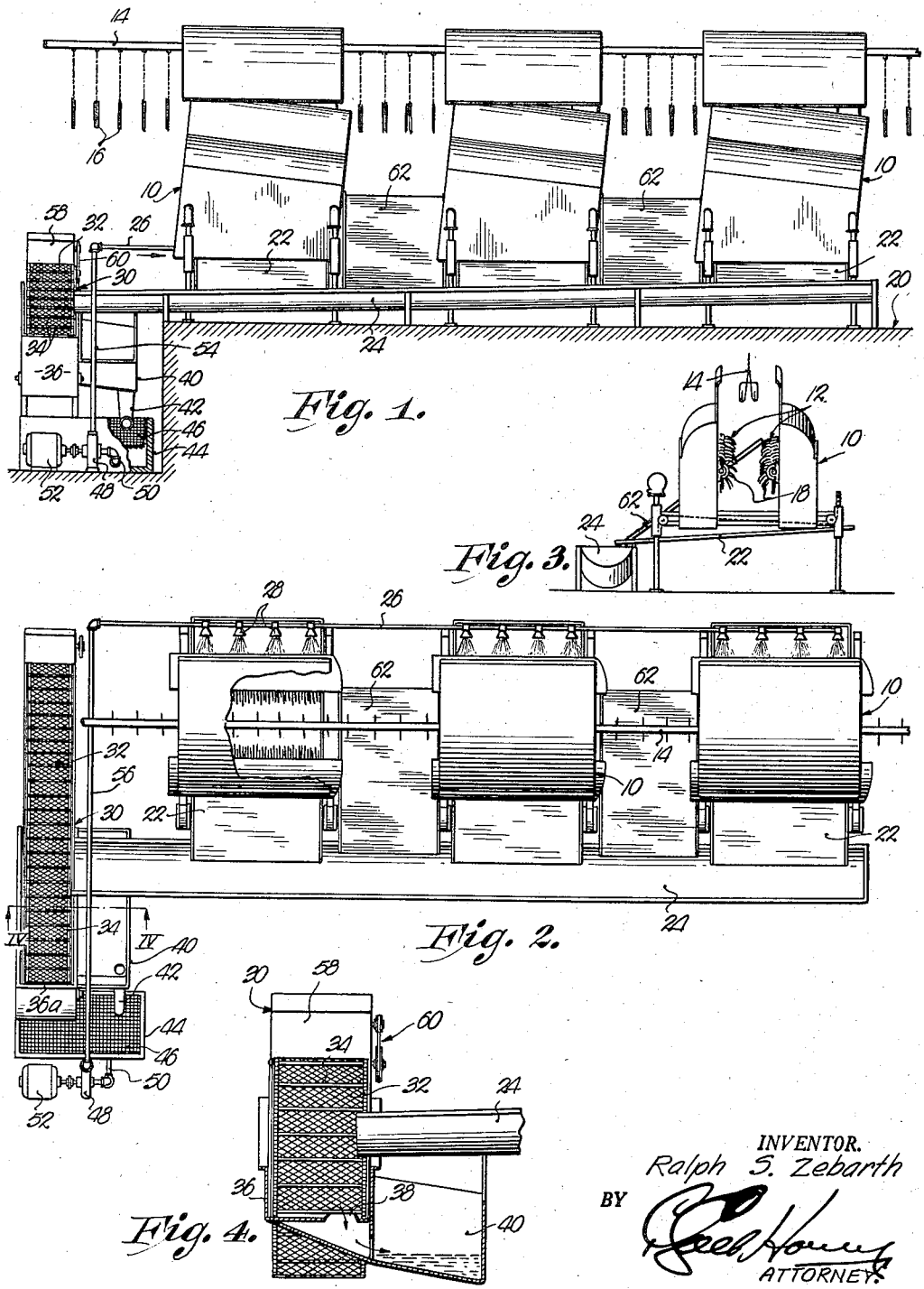
March 10, 1959   R. S. ZEBARTH   2,876,488
METHOD OF AND APPARATUS FOR REMOVING FEATHERS FROM PLUCKING
MACHINES OF POULTRY PROCESSING PLANTS
Filed Sept. 27, 1954
INVENTOR.
Ralph S. Zebarth
BY
ATTORNEY.

2,876,488

METHOD OF AND APPARATUS FOR REMOVING FEATHERS FROM PLUCKING MACHINES OF POULTRY PROCESSING PLANTS

Ralph S. Zebarth, Hickman Mills, Mo., assignor to Gordon Johnson Equipment Company, Kansas City, Mo., a corporation of Missouri Application September 27, 1954, Serial No. 458,367

8 Claims. (Cl. 17—11.1)

This invention relates to the removal of waste materials in processing plants such as feathers removed from poultry, and has for its primary object the provision of a novel system for automatically and continuously maintaining the area in and around the plucking machines free and clear of the feathers removed thereby.

Plant appearance is becoming more and more important as the poultry industry strives to meet the standards of the field of food processing. It is manifest that the dressing of poultry is by its very nature an operation that tends to quickly and continually give the plant an unsightly appearance unless, throughout the entire plant, steps are taken to maintain all equipment, as well as the floors, walls and the like, free and clear of the waste materials that are removed from the birds during the steps of scalding, picking, finishing and packing.

Processors have heretofore made many demands in this respect and for the most part, the waste material collected by the scalders, the viscera, hocks, quills, heads and the like, have been automatically carried away at the time of removal.

Flying feathers that are removed by automatic machines in the processing plants present a special problem of removal since they tend to become scattered throughout the plant unless kept closely confined, and inasmuch as such waste material additionally tends to cling to any surface against which it engages, the usual type of equipment for removing the same has not proved entirely satisfactory. Consequently, in many plants, feather removal after such feathers are plucked from the poultry, is still carried out as a hand operation. In this connection, the removed feathers are oftentimes merely permitted to fall to the floor beneath the plucking machine and are subsequently removed through use of hand tools such as brooms, brushes and shovels. The floor of the plant then must be scrubbed down, leaving a damp and otherwise undesirable condition that tends to exist whenever the plant is in operation.

It is the most important object of the instant invention, therefore, to provide a method together with novel apparatus, satisfactorily removing waste materials such as feathers in a manner to eliminate the aforementioned hand labor, and more important, to maintain a clean and neat appearance in that part of the processing plant where the birds are subjected to feather removal.

Another important object of the instant invention is to provide for feather removal in poultry processing plants that contemplates the utilization of water as a flushing agent which is flooded beneath the plucking machine, collected along with the feathers flushed from beneath such machine and carried to a point of discharge remote from the machine so as to not interfere in any way whatsoever with the normal feather removing operations.

A further object of this invention is to provide for a feather removing system utilizing water as a flushing medium as aforesaid, and including means for separating the feathers and the water so that the latter may be recirculated back to a point of reuse so as to continually flush away the feathers as the same are removed from the poultry by the plucking machine.

A still further object of this invention is to provide a system as above set forth wherein is included a novel conveyor that receives the feathers, drains the water therefrom and moves such waste material to a point of collection and ultimate disposal.

Other objects include such important steps of feather removal and details of construction of the novel apparatus for carrying out the method, all to be made clear as the following specification progresses.

In the drawing:

Figure 1 is a side elevational view of apparatus for removing feathers from plucking machines of poultry processing plants made pursuant to the present invention.

Fig. 2 is a plan view thereof.

Fig. 3 is an end elevational view; and

Fig. 4 is a cross-sectional view taken on line IV—IV of Fig. 2.

The system about to be described is particularly adapted for use in poultry processing plants and has been designed especially for removal of feathers emanating from plucking machines such as designated by the numeral 10 in the drawing.

The automatic pickers 10 chosen for illustration, form no part of the instant invention and it is, therefore, merely necessary to point out that such pickers are provided with a pair of rotating drums 12 as best seen in Fig. 3 of the drawing, between which the poultry is advanced.

An overhead conveyor 14 is normally provided for suspending the birds through use of shackles 16 and when the drums 12 are rotated, a plurality of flexible fingers 18 forming a part of the drums 12, extend radially from the limp condition shown in Fig. 3, wipe against the birds and pull the feathers therefrom as the poultry is advanced through the machines 10 by the operation of the conveyor 14.

Details of construction of the type of picker shown in the drawing are disclosed in my copending application, Serial No. 411,750, filed February 23, 1954, and as therein made clear, the feathers thus removed are merely permitted to fall or forced downwardly by gravity for collection on the supporting surface 20 for the machines 10. Such waste material is subsequently removed in various manners, but in all events a rather messy condition exists throughout the time the plant is in operation.

In accordance with the principles of the present invention, there is provided means directly beneath each machine 10 respectively, for receiving or collecting the feathers removed by the picking drums 12 and taking the form of an inclined ramp 22 in the nature of a relatively shallow pan or apron. The ramps 22 slope downwardly toward an open top trough 24 and may be supported in any suitable manner by the machines 10. Trough 24 underlies the lowermost ends of the ramps 22 and a water supply conduit 26 extends across the series of ramps 22 at their uppermost edges. A plurality of outlet nozzles or spray heads 28 interposed in the line 26, are disposed to direct water across the pans 22 to flush the feathers therefrom continuously and automatically throughout the time the machines 10 are in operation. Such water and feathers are collected by the trough 24 and inasmuch as the latter is inclined, as seen in Fig. 1, such flushing water and the waste material will flow from the lower open end of the trough 24 onto a conveyor or elevator 30.

Conveyor 30 is provided with a continuous foraminous belt 32 that is in turn provided with a plurality of transverse flights 34 for carrying the feathers forwardly and upwardly to the discharge end of the conveyor 30. By virtue of such construction of the conveyor 30 the water and feathers are separated and the water is collected in an open top receptacle 36 that underlies the lowermost stretch of the foraminous belt 32 at the lowermost end of the conveyor 30 and which is disposed directly beneath the lowermost discharge end of the trough 24. Receptacle 36 is U-shaped in cross-section and, therefore, extends upwardly along the sides of the conveyor belt 32 and thereabove to retain feathers and water tending to gravitate toward the lowermost end 36a of receptacle 36 and with respect to the conveyor 30.

Receptacle 36 has a discharge opening 38 and the water therefore flows from the receptacle 36 to a basin 40 and into a pipe 42 placing the basin 40 in communication with a sump 44. A screen 46 overlying the sump 44 removes any additional foreign matter that may be entrained in the water flowing from the basin 40, and a pump 48 has its inlet line 50 communicating with the sump 44 beneath the screen 46. Pump 48 is driven by a prime mover 52 to direct the water from the sump 44 into an upright line 54, a laterally extending pipe 56, and thence into the conduit 26 for discharge from the nozzles 28.

Conveyor belt 32 may be driven in any suitable manner such as by a prime mover not shown, contained in a housing 58 at the uppermost end of conveyor 30 and operably coupled with belt 32 by belt and pulley means 60.

In operation, and as above indicated, poultry suspended from the conveyor 14 by use of shackles 16 is advanced through one or more picking machines 10, normally at a continuous and uniform rate. The continuously rotating fingered drums 12 of the machines 10 wipe and slap against the previously scalded birds, removing the feathers therefrom and tending to direct such feathers downwardly where the same are collected by the inclined pans or ramps 22. All foreign matter, scalding liquid and the like, is thus collected and, if desired, such waste material that may drip from the birds as they pass from machine to machine, may be collected by intermediate pans 62. As in the case of pans 22, the pans 62 may be mounted in any suitable manner and should incline downwardly toward the trough 24.

Inasmuch as water or other flushing liquid is emanating from the nozzles 28 under pressure at all times during use of the apparatus of the instant invention, all of the aforesaid waste material, particularly the feathers, is washed downwardly into the collecting trough 24 whence the same flows on to the continually moving, foraminous belt 32 of conveyor 30.

For the most part all of the liquid drains immediately into the underlying receptacle 36 and the feathers are moved upwardly along the conveyor 30 for discharge into a suitable receptacle (not shown) at the upper end of conveyor 30. The water drains from the receptacle 36 and into the basin 40 by way of outlet 38 and pipe 42. All foreign matter that would tend to interfere with the operation of pump 48 or clog the nozzles 28 is removed either by the conveyor belt 32 or the screen 46 and, therefore, the water that recirculates to flood the pans 22 is relatively free of waste material. Manifestly, additional nozzles in the line 26 may be provided to flush the pans 62, but normally the latter can be easily washed at the end of each cycle of operation.

Having thus described the invention what is claimed as new and desired to be secured by Letters Patent is:

1. The method of removing feathers emanating from the plucking machine of a poultry processing plant comprising collecting the feathers on an inclined ramp disposed beneath the machine; flooding the ramp with water to flush the feathers to the lowermost end of the ramp; collecting the feathers and the water flowing from the ramp into an inclined trough; directing the feathers and water emanating from the trough onto a continuously advancing, foraminous conveyor; collecting the water draining from the feathers through the conveyor; and pumping the collected water back to the ramp for flow therealong to said lowermost end thereof.

2. Apparatus for removing feathers descending from the plucking machine of a poultry processing plant comprising an inclined, pan-like ramp adapted for disposition beneath said machine for receiving said feathers; a plurality of nozzles along the uppermost edge of the ramp for directing water onto the ramp to flush the feathers from beneath the machine to the lowermost edge of the ramp; an inclined, open top trough alongside the machine beneath said lowermost edge of the ramp for receiving the feathers and water flowing therefrom; a continuous, foraminous conveyor disposed beneath the lowermost end of the trough; a receptacle beneath the conveyor for collecting water draining from the conveyor; and means for pumping the water from the receptacle to the nozzles.

3. The method of removing feathers from the plucking machine of a poultry processing plant wherein the poultry is advanced through the machine by utilization of an overhead conveyor moving along a predetermined path of travel comprising collecting the feathers on an inclined ramp disposed beneath the machine; flooding the ramp with water to flush the feathers laterally from beneath the machine to the lowermost end of the ramp; collecting the feathers and the water flowing from the ramp into an inclined trough disposed alongside the machine in substantial parallelism to the path of travel of the poultry; directing the feathers and water emanating from the trough onto a continuously advancing, foraminous conveyer; collecting the water draining from the feathers through the conveyor; and pumping the collected water back to the ramp for flow therealong to said lowermost end thereof.

4. The method of removing feathers from the plucking machine of a poultry processing plant wherein the poultry is advanced through the machine by utilization of an overhead conveyor moving along a predetermined path of travel comprising collecting the feathers on an inclined ramp disposed beneath the machine; flooding the ramp with water to flush the feathers laterally from beneath the machine to the lowermost end of the ramp; collecting the feathers and the water flowing from the ramp into an inclined trough disposed alongside the machine in substantial parallelism to the path of travel of the poultry; collecting the feathers emanating from the trough and directing the same laterally to a point of discharge at one side of said path of travel of the poultry while simultaneously separating the water and feathers emanating from the trough; collecting said separated water; and pumping the collected water back to the ramp for flow therealong to said lowermost end thereof.

5. The method of removing feathers emanating from the plucking machine of a poultry processing plant comprising collecting the feathers on an inclined ramp disposed beneath the machine; flooding the ramp with water to flush the feathers to the lowermost end of the ramp; collecting the feathers and the water flowing from the ramp into an inclined trough; directing the feathers and water emanating from the trough onto a continuously advancing, foraminous conveyor; collecting the water draining from the feathers through the conveyor into an inclined receptacle beneath the conveyor; straining foreign matter from the collected water emanating from the lowermost end of the receptacle; and pumping the strained water back to the ramp for flow therealong to said lowermost end thereof.

6. The method of removing feathers emanating from a plurality of aligned plucking machines of a poultry processing plant comprising collecting the feathers on inclined ramps disposed beneath the machines; flooding the ramps with water to flush the feathers to the lowermost end of the ramps; collecting the feathers and the water flowing from all of the ramps into an inclined trough common to the ramps and the machines and extending alongside the latter; directing the feathers and water emanating from the trough onto a continuously advancing; foraminous conveyor; collecting the water draining from the feathers through the conveyor; and pumping the collected water back to the ramps for flow therealong to said lowermost ends thereof.

7. The method of removing feathers emanating from a plurality of spaced-apart, aligned plucking machines of a poultry processing plant wherein the poultry is advanced successively through the machines by utilization of an overhead conveyor moving along a path of travel coincident with the longitudinal axes of the machines, said method comprising the steps of collecting the feathers on inclined ramps disposed beneath each machine respectively and therebetween; flooding the ramps beneath the machines with water; collecting the feathers and water flowing from the ramps into an inclined trough common to the ramps and the machines and disposed alongside the latter in substantial parallelism to said path of travel of the poultry; directing the feathers and water emanating from the trough onto a continuously advancing, foraminous conveyor; collecting the water draining from the feathers through the conveyor; and pumping the collected water back to the ramps beneath the machines for flow therealong to said lowermost ends thereof.

8. Apparatus for removing feathers from a plurality of aligned plucking machines of a poultry processing plant wherein the poultry is advanced through the machines along a predetermined path of travel, said apparatus including a ramp adapted for disposition beneath each machine respectively; water supply means for flushing feathers from the ramp laterally from beneath the machines; an inclined, imperforate trough alongside the machines in parallelism with said path of travel of the poultry and disposed to receive water and feathers from the ramps; and a perforated conveyor disposed to receive the water and feathers emanating from the lowermost end of the trough for separating the water from the feathers and advancing the latter to a point of collection.

References Cited in the file of this patent

UNITED STATES PATENTS

| | | |
|---|---|---|
| 508,885 | Johnston | Nov. 14, 1893 |
| 1,077,636 | Paul | Nov. 4, 1913 |
| 1,423,342 | Loew | July 18, 1922 |
| 1,952,568 | Schapp | Mar. 27, 1934 |
| 2,050,634 | Stegemann | Aug. 11, 1936 |
| 2,557,335 | Barker | June 19, 1951 |
| 2,560,524 | Johnson | July 10, 1951 |
| 2,602,186 | Johnson | July 8, 1952 |
| 2,737,191 | Viall | Mar. 6, 1956 |